United States Patent
Han et al.

(10) Patent No.: US 11,418,262 B2
(45) Date of Patent: Aug. 16, 2022

(54) OPTICAL MODULE COMPRISING A REFLECTIVE SURFACE AT A PRESET ANGLE FOR REFLECTING LIGHT FROM LIGHT TRANSMITTING LENSES TO LIGHT RECEIVING LENSES

(71) Applicant: InnoLight Technology (Suzhou) LTD., Jiangsu (CN)

(72) Inventors: Ming Han, Jiangsu (CN); Yue Xiao, Jiangsu (CN)

(73) Assignee: InnoLight Technology (Suzhou) Ltd., Suzhou (CN)

(*) Notice: Subject to any disclaimer, the term of this patent is extended or adjusted under 35 U.S.C. 154(b) by 140 days.

(21) Appl. No.: 16/810,965

(22) Filed: Mar. 6, 2020

(65) Prior Publication Data

US 2020/0287629 A1  Sep. 10, 2020

(30) Foreign Application Priority Data

Mar. 8, 2019  (CN) .......................... 201910174488.2

(51) Int. Cl.
  *H04B 10/40* (2013.01)
  *G02B 3/00* (2006.01)

(52) U.S. Cl.
  CPC ............. *H04B 10/40* (2013.01); *G02B 3/005* (2013.01)

(58) Field of Classification Search
  CPC ...... G02B 3/0062; G02B 6/43; G02B 6/4204; H04B 10/43; H04B 10/40; H04B 15/00; G01S 13/88; G01S 17/00

USPC ...................... 250/216, 239, 214.1
See application file for complete search history.

(56) References Cited

U.S. PATENT DOCUMENTS

| | | | |
|---|---|---|---|
| 9,971,109 B1 | 5/2018 | Wu et al. | |
| 10,976,510 B2* | 4/2021 | Kon | ...................... G02B 6/425 |
| 2007/0286549 A1 | 12/2007 | Warashina et al. | |
| 2008/0226228 A1 | 9/2008 | Tamura et al. | |
| 2012/0263416 A1 | 10/2012 | Morioka | |

FOREIGN PATENT DOCUMENTS

| | | |
|---|---|---|
| CN | 1918497 A | 2/2007 |
| CN | 101266325 A | 9/2008 |
| CN | 102667565 B | 5/2015 |
| CN | 107219590 A | 9/2017 |

* cited by examiner

*Primary Examiner* — Que Tan Le
(74) *Attorney, Agent, or Firm* — Finnegan, Henderson, Farabow, Garrett & Dunner, LLP

(57) ABSTRACT

An optical module includes a substrate, an optical device, and a plurality of light transmitting elements and a plurality of light receiving elements disposed between the optical device and the substrate. The optical device includes a device body, and an optical transceiver interface and a lens array that are disposed on the device body. The lens array is configured to optically couple the plurality of light transmitting elements with the optical transceiver interface, and optically couples the optical transceiver interface with the plurality of light receiving elements. An auxiliary lens is disposed on an optical coupling path between the plurality of light transmitting elements and the optical transceiver interface or between the optical transceiver interface and the plurality of light receiving elements.

10 Claims, 4 Drawing Sheets

OPTICAL MODULE COMPRISING A REFLECTIVE SURFACE AT A PRESET ANGLE FOR REFLECTING LIGHT FROM LIGHT TRANSMITTING LENSES TO LIGHT RECEIVING LENSES

CROSS-REFERENCE TO RELATED APPLICATION

This application is based upon and claims priority to Chinese Patent Application 201910174488.2, filed on Mar. 8, 2019, the entire content of which is incorporated herein by reference.

FIELD OF THE DISCLOSURE

The present invention relates to the field of optical communication technology and more particularly to an optical module.

BACKGROUND

In recent years, optical interconnect technology has been widely applied. This technology transmits signals at a high speed within a device or between devices in a system or between optical modules. In other words, optical interconnect technology is a technology that considers optical devices as electrical components and installs optical devices on motherboards or circuit substrates for use in, for example, personal computers, vehicles, and optical transceivers.

With rapid technological development, demand exists for optical communication modules to be faster in transmission speed and lower in cost, which may require that the communication speed and volume of a module increase by a factor of several times while its density remains the same. At present, multimode devices mostly use a multi-channel parallel method, which, however, has a relatively high cost and a transmission speed that fails to meet the demand to be faster.

SUMMARY

Purposes of the present disclosure include providing an optical module featuring faster transmission speed and lower cost.

To achieve one or more of the purposes above, one embodiment of the present disclosure provides an optical module including, a substrate, an optical device, and a plurality of light transmitting elements and a plurality of light receiving elements disposed between the optical device and the substrate. The optical device is disposed above the plurality of light transmitting elements and the plurality of light receiving elements. The optical device includes a device body, and an optical transceiver interface and a lens array that are disposed on the device body. The optical device is configured so that an optical signal transmitted from the plurality of light transmitting elements passes through the optical transceiver interface before leaving the optical module, and an optical signal transmitted from outside of the optical module passes through the optical transceiver interface before reaching the plurality of light receiving elements. The lens array is configured to optically couple the plurality of light transmitting elements with the optical transceiver interface, and to optically couple the optical transceiver interface with the plurality of light receiving elements. The lens array includes:

a plurality of light transmitting lenses arranged along a same direction as the plurality of light transmitting elements and located on the first surface of the device body facing the plurality of light transmitting elements, light transmitted from each of the plurality of light transmitting elements entering into a corresponding one of the plurality of light receiving light transmitting lenses;

a plurality of light receiving lenses arranged along the same direction as the plurality of light receiving elements and located on the first surface of the device body facing the plurality of light receiving elements, light entering into each of the plurality of light receiving elements coming from a corresponding one of the plurality of light receiving light receiving lenses;

a reflective surface arranged at a preset angle relative to the first surface, the reflective surface reflecting light from each of the plurality of light transmitting lenses to the optical transceiver interface or reflecting light from the optical transceiver interface to the plurality of light receiving lenses;

an optical filter arranged parallel to the reflective surface, the optical filter reflecting light from the optical transceiver interface to the plurality of light receiving lenses and letting pass light reflected by the reflective surface from each of the plurality of light transmitting lenses, or reflecting light from each of the plurality of light transmitting lenses to the optical transceiver interface and letting pass light from the optical transceiver interface;

a plurality of optical transceiver lenses arranged in the same direction as the plurality of light transmitting lenses and formed on a second surface of the device body, the plurality of optical transceiver lenses receiving reflected light from the reflective surface or the optical filter and guiding light that enters the optical transceiver interface to the light-filtering plate or reflective surface; and at least one auxiliary lens disposed on an optical coupling path between the plurality of light transmitting elements and the optical transceiver interface, or on an optical coupling path between the optical transceiver interface and the plurality of light receiving elements.

DETAILED DESCRIPTION

The text below provides a detailed description of the present disclosure with reference to specific embodiments illustrated in the attached drawings. However, these embodiments do not limit the present invention; the scope of protection for the present invention covers changes made to the structure, method, or function by persons having ordinary skill in the art on the basis of these embodiments.

Figure 1:
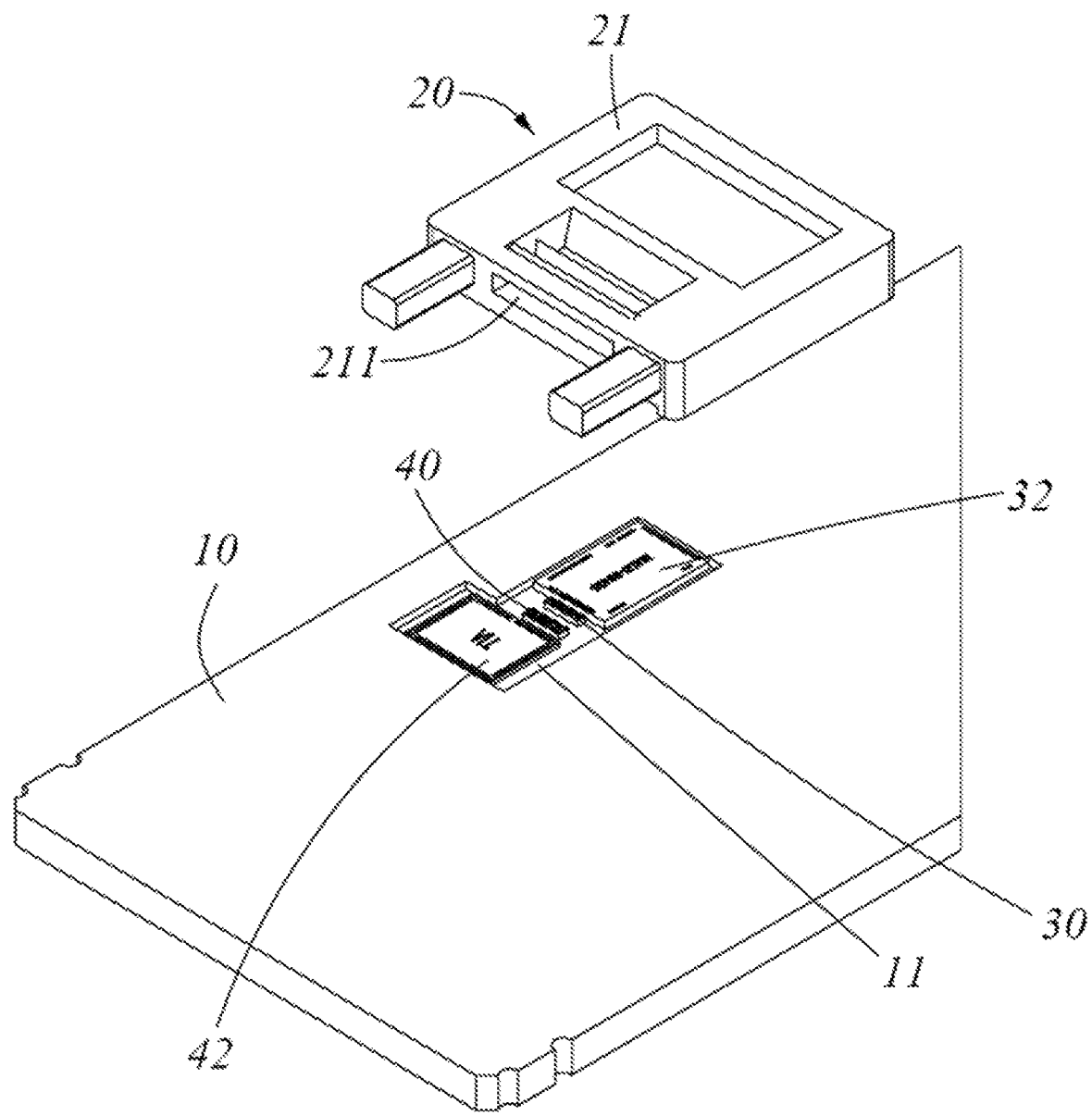
FIG. 1 is a diagram showing a perspective exploded view of a portion of an optical module in an embodiment of the present invention.
Figure 2:
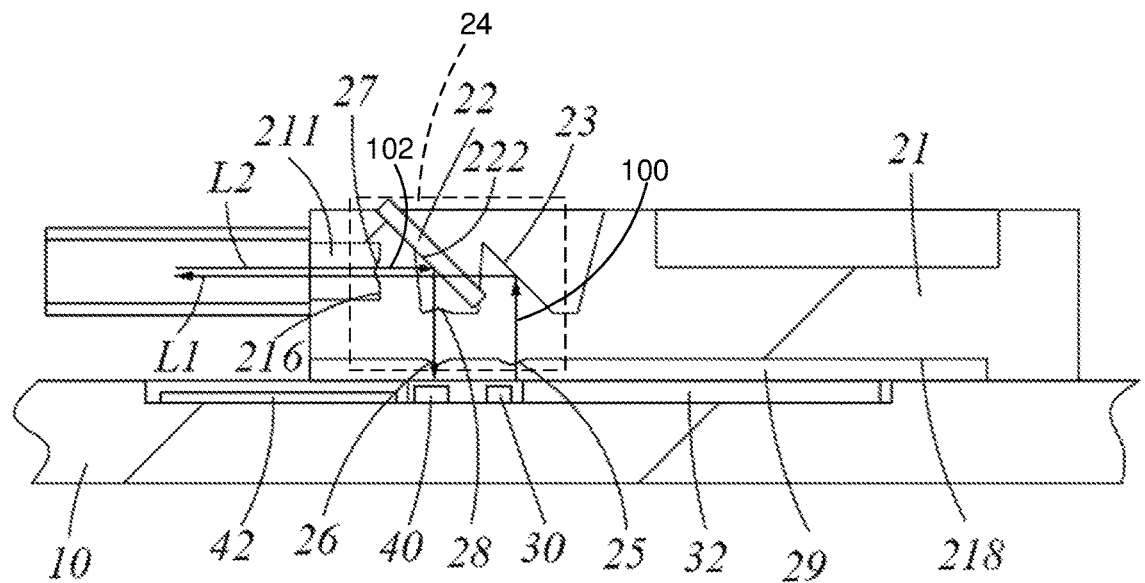
FIG. 2 is a schematic diagram of optical paths in the optical module in FIG. 1, illustrating optical paths between a light transmitting element and an optical transceiver interface and between the optical transceiver interface and a light receiving element.
Figure 3:
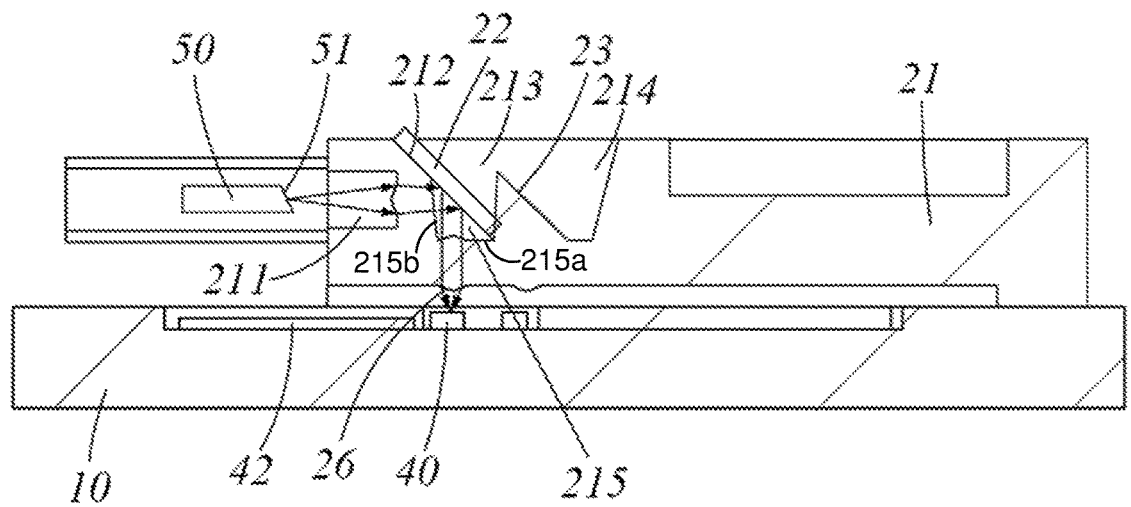
FIG. 3 is a schematic diagram of an optical path in the optical module in FIG. 1, illustrating an optical path between an optical fiber and a light receiving element.
Figure 4:
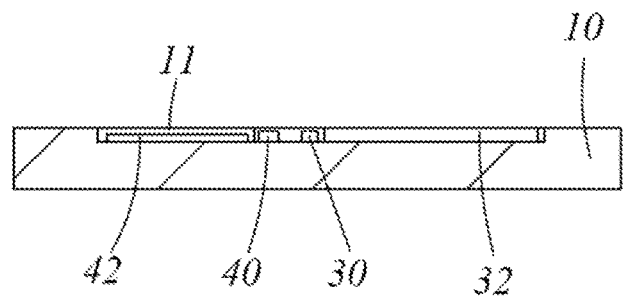
FIG. 4 is a cutaway diagram of a substrate of the optical module in FIG. 1.
Figure 5:
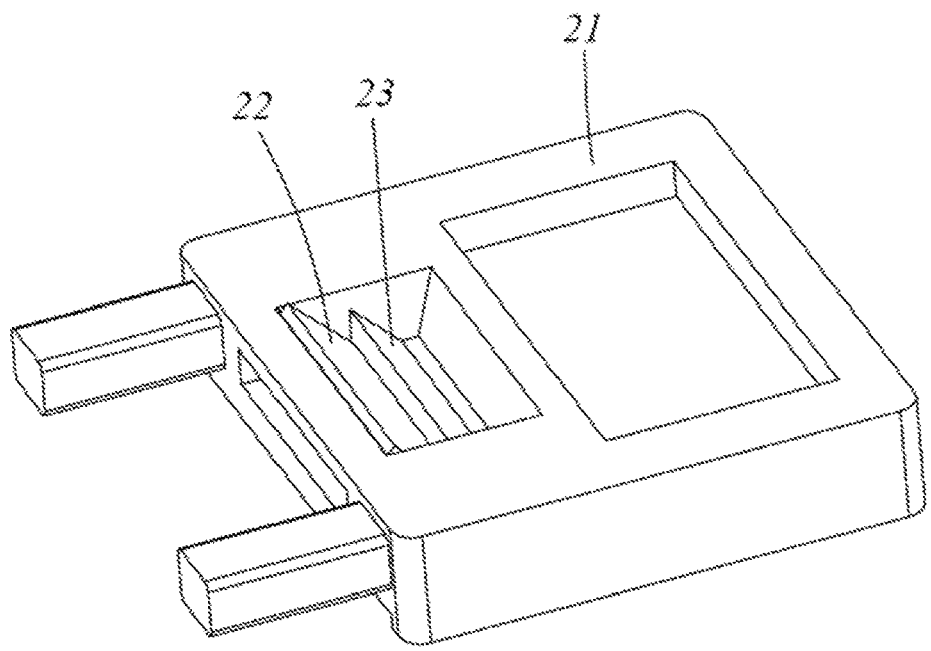
FIG. 5 is a main view of the optical device in FIG. 1.
Figure 6:
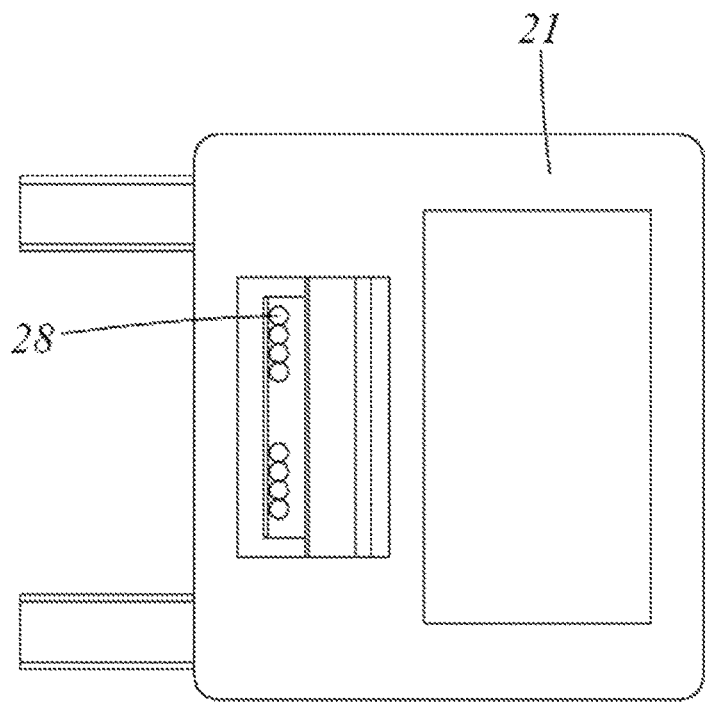
FIG. 6 is a top view of the optical device in FIG. 5.
Figure 7:
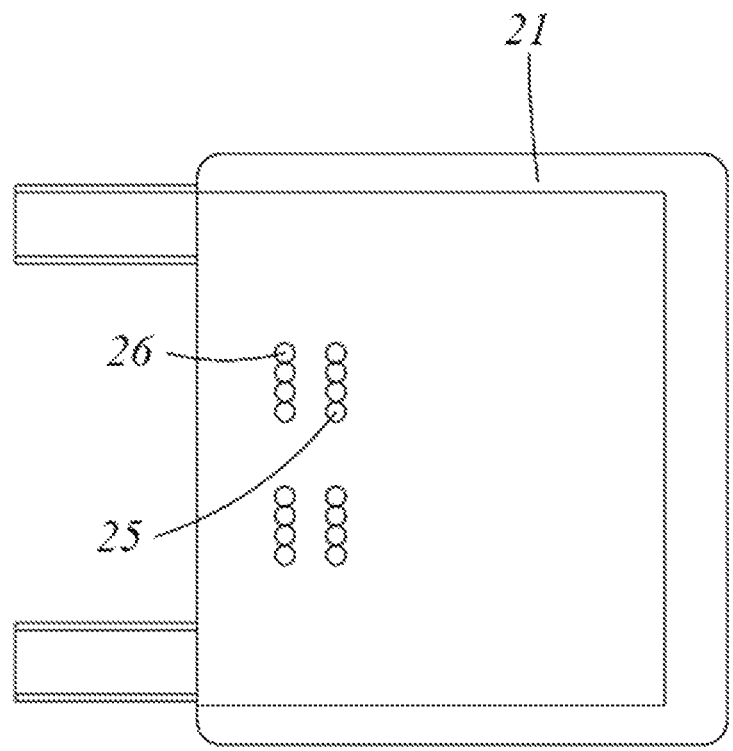
FIG. 7 is a bottom view of the optical device in FIG. 5.
Figure 8:
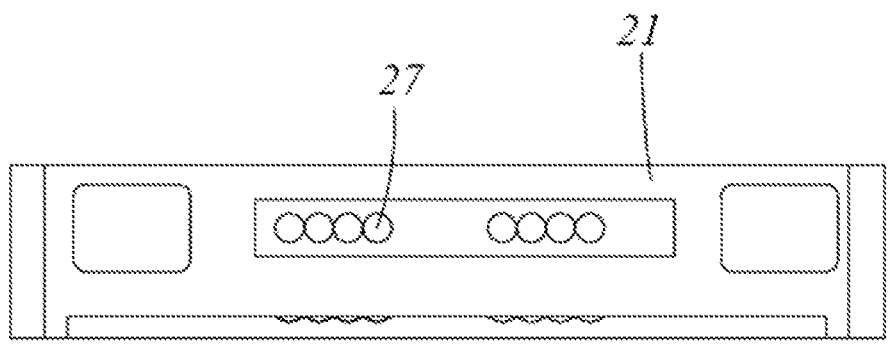
FIG. 8 is a side view of the optical device in FIG. 5.

FIG. 1 is a diagram showing a perspective exploded view of a portion of an optical module of an embodiment of the present disclosure. FIG. 2 is a schematic diagram of optical paths between a light transmitting element and an optical transceiver interface and between the optical transceiver interface and a light receiving element in the optical module in FIG. 1. FIG. 3 is a schematic diagram of an optical path between an optical fiber and the light receiving element in the optical module in FIG. 1. FIG. 4 is a cutaway diagram of a substrate of the optical module in FIG. 1. FIG. 5 is a perspective view of an optical device in FIG. 1. FIG. 6 is a top view of the optical device in FIG. 5. FIG. 7 is a bottom view of the optical device in FIG. 5. FIG. 8 is a side view of the optical device in FIG. 5. As shown in FIGS. 1 through 8, in one embodiment of the present disclosure, an optical module includes a housing (not shown in the figures), a substrate 10 disposed in the housing, an electronic element disposed on the substrate 10, a plurality of light transmitting elements 30 and a plurality of light receiving elements 40 disposed on the substrate 10, and an optical device 20 disposed in the housing. The light transmitting elements 30 and the light receiving elements 40 are disposed between the optical device 20 and the substrate 10. The optical device 20 is disposed above the light transmitting elements 30 and the light receiving elements 40. The optical device 20 includes a device body 21, an optical transceiver interface 211, and a lens array 24 that are disposed on the device body 21. An optical signal transmitted from the light transmitting elements 30 passes through the optical transceiver interface 211 to the outside of the optical module. An optical signal from outside of the optical module passes through the optical transceiver interface 211 and reaches the light receiving elements 40. The lens array 24 enables optical coupling between the light transmitting elements 30 and the optical transceiver interface 211 and between the optical transceiver interface 211 and the light receiving elements 40.

In the example embodiment, the device body 21 may be produced by plastic molding. The optical transceiver interface 211 is disposed on a side surface of the device body 21. The optical transceiver interface 211 is used to connect to an optical fiber 50 as shown in FIG. 3. The lens array 24 is used to convert a first optical path L1 of a first optical signal outputted from the optical transceiver interface 211 and to convert a second optical path L2 of a second optical signal inputted into the optical transceiver interface 211. The wavelength of the first optical signal may be different from the wavelength of the second optical signal. In other words, the same optical transceiver interface 211 may receive and transmit two lines of signals of different wavelengths. As a result, the structure of the optical device 20 is simplified, as the optical module uses the same optical fiber for light transmission and reception and cuts the use of optical fibers by half, and thus the cost is reduced.

In the example embodiment, there are multiple light transmitting elements 30 and multiple light receiving elements 40. The light transmitting elements 30 and the light receiving elements 40 are disposed at corresponding locations on the substrate 10 with a space between them. The optical device 20 is disposed covering the light transmitting elements 30 and the light receiving elements 40 from above. The substrate 10 is a printed circuit board (PCB). One or more of electronic elements, electronic chips, and optical chips that correspond to the light transmitting elements 30 and the light receiving elements 40 are formed on the substrate 10. The plurality of light transmitting elements 30 and the plurality of light receiving elements 40 are arranged in arrays along the same direction. An array direction of the plurality of light transmitting elements 30 is parallel to an array direction of the plurality of light receiving elements 40. The optical module further includes a driver chip 32 that drives the light transmitting elements 30 and a TIA (transimpedance amplifier) chip 42 that drives the light receiving elements 40. The light transmitting elements 30 include a plurality of VCSEL (vertical-cavity surface-emitting laser) chips, and the light receiving elements 40 include a plurality or PD (photodiode) chips. The VCSEL chips and the PD chips align with their corresponding driver chip 32 and TIA chip 42, respectively. The VCSEL chips and the PD chips may be welded directly onto the PCB. Alternatively, the VCSEL chips and the PD chips may be welded on a metal plate and electrically connected to their corresponding driver chip 32 and TIA chip 42 by conductive wires. In the example embodiment, the plurality of light transmitting elements 30, the plurality of light receiving elements 40, the driver chip 32 that drives the plurality of light transmitting elements 30, and the TIA chip 42 that drives the plurality of light receiving elements 40 are all mounted on the substrate 10. A substrate recess 11 is arranged on the substrate 10. At least the plurality of light transmitting elements 30 and the plurality of light receiving elements 40 are located in the substrate recess 11. Alternatively, the plurality of light transmitting elements 30, the plurality of light receiving elements 40, the driver chip 32 that drives the plurality of light transmitting elements 30, and the TIA chip 42 that drives the plurality of light receiving elements 40 may all be located in the substrate recess 11 to minimize the overall volume of the optical module. The depth of the recess 11 may be adjusted in accordance with the height of the plurality of light transmitting elements 30, the plurality of light receiving elements 40, the driver chip 32, and the TIA chip 42. The optical device 20 may be mounted above the substrate recess 11 to prevent damage from impact during mounting. The substrate recess 11 may be formed in a plurality of ways. For example, the substrate may be a PCB having a portion that is filled with high density through-hole copper. The portion filled with high density through-hole copper may form the substrate recess 11, and the plurality of light transmitting elements 30, the driver chip 32, the plurality of light receiving elements 40, and the TIA chip 42 may all be mounted in the portion filled with high density through-hole copper. Alternatively, a portion of the substrate may also be embedded with a copper plate. The portion of the substrate embedded with the copper plate may form the substrate recess 11, and the plurality of light transmitting elements 30, the driver chip 32, the plurality of light receiving elements 40, and the TIA chip 42 may all be mounted on the copper plate. The substrate embedded with the copper plate may be thermally connected to the housing for better heat dissipation.

In order to minimize an overall volume of the optical module, the device body 21 may include a body recess 29. A bottom of the body recess 29 (that is, an upper surface of the body recess 29 shown in FIG. 2) forms a first surface 218. At least the plurality of light transmitting elements 30 and the plurality of light receiving elements 40 may correspond to the body recess 29. In other words, the plurality of light transmitting elements 30 and the plurality of light receiving elements 40 may be located in the body recess 29, or may be positioned to correspond to the body recess 29.

The light transmitting elements 30 may be DFB lasers, EML lasers, or another type of laser chips. Similarly, the light receiving elements 40 may also be PIN chips, ADP chips, or another type of detector chips. The optical module may further include an MPD chip (monitor photodiode chip) disposed on the PCB. The role of the MPD chip is to receive a portion of the light beam transmitted from the VCSEL chip and to generate a backlight current and monitor the backlight current to realize control of the optical power.

The lens array 24 includes: a plurality of light transmitting lenses 25, a plurality of light receiving lenses 26, a reflective surface 23, an optical filter 22, a plurality of optical transceiver lenses 27, and at least one auxiliary lens 28.

The plurality of light transmitting lenses 25 are arranged along the same direction as the plurality of light transmitting elements 30. The plurality of light transmitting lenses 25 are located on the first surface 218 of the device body 21 facing the plurality of light transmitting elements 30. Light transmitted from each of the plurality of light transmitting elements 30 enters into a corresponding one of the plurality of light receiving light transmitting lenses 25.

The plurality of light receiving lenses 26 are arranged along the same direction as the plurality of light receiving elements 40. The plurality of light receiving lenses 26 are located on the first surface 218 of the device body 21 facing the plurality of light receiving elements 4. Light entering into each of the plurality of light receiving elements 40 comes from its corresponding one of the plurality of light receiving lenses 26.

The reflective surface 23 is arranged at a preset angle relative to the first surface 218. In the embodiment illustrated in FIGS. 2-3, the reflective surface 23 reflects light from each of the plurality of light transmitting lenses 25 to the optical transceiver interface 211. In another embodiment (not illustrated), the reflective surface 23 may reflect light from the optical transceiver interface 211 to the plurality of light receiving lenses 26.

The optical filter 22 is arranged parallel to the reflective surface 23. In the embodiment illustrated in FIGS. 2-3, the optical filter 22 reflects light from the optical transceiver interface 211 to the plurality of light receiving lenses 26 and lets pass light reflected by the reflective surface 23 from each of the plurality of light transmitting lenses 25. In another embodiment (not illustrated), the optical filter 22 may reflect light from each of the plurality of light transmitting lenses 25 to the optical transceiver interface 211 and let pass light from the optical transceiver interface 211.

The plurality of optical transceiver lenses 27 are arranged in the same direction as the plurality of light transmitting lenses 25 and are formed on a second surface 216 of the device body 21. The plurality of optical transceiver lenses 27 receive light reflected from the reflective surface 23 or the optical filter 22, and guide light that enters the optical transceiver interface 211 to the optical filter 22 or the reflective surface 23.

The at least one auxiliary lens 28 is disposed on an optical coupling path between the plurality of light transmitting elements 30 and the optical transceiver interface 211, or on an optical coupling path between the optical transceiver interface 211 and the plurality of light receiving elements 40. The at least one auxiliary lens 28 may be located between the first surface 218 of the device body 21 and the optical filter 22 or between the first surface 218 and the reflective surface 23. The quantity of the auxiliary lenses 28 may be the same as the quantity of the light transmitting lenses 25 or the light receiving lens 26, and the locations of the auxiliary lenses 28 and the locations of the light transmitting lenses 25 or light receiving lenses 26 have a one-to-one corresponding relationship.

By arranging the auxiliary lens 28 on the optical path, when the optical path of the optical device 20 is relatively long, a light spot may be better concentrated, thus achieving a greater coupling efficiency and a larger tolerance range.

In the example embodiment, the optical device 20 conducts the first optical signal transmitted from the light transmitting elements 30 to the optical transceiver interface 211 through the guiding effect of the lens array 24, thus diverting the first optical path L1. The optical device 20 also conducts the second optical signal transmitted from the optical transceiver interface 211 to the light receiving elements 40 through the guiding effect of the lens array 24, thus diverting the second optical path L2. The device body 21 may be secured on the PCB (substrate 10) by welding or gluing. The location of the transmitting lenses 25 corresponds to and is above the location of the light transmitting elements 30. The arrangement of the transmitting lenses 25 corrects minor deviations on the first optical path L1, thus reducing coupling difficulty. The location of the receiving lenses 26 corresponds to and is above the location of the light receiving element 40. Similarly, the arrangement of the receiving lenses 26 corrects minor deviations on the second optical path L2, thus reducing coupling difficulty. The reflective surface 23 is located above the transmitting lenses 25. The optical filter 22 is disposed on the device body 21 and forms a first inclined surface 222. The location of the first inclined surface 222 corresponds to and is above the location of the receiving lenses 26. The arrangement of the optical filter 22 allows the optical path to be glueless. The optical filter 22 reflects the second optical signal to the receiving lenses 26. The reflective surface 23 reflects the first optical signal to the transceiver lenses 27. The auxiliary lens 28 is disposed between the receiving lenses 26 and the optical filter 22.

The first optical signal at a wavelength $\lambda 1$ transmitted from the light transmitting elements 30 is converted to parallel light rays after passing through the transmitting lenses 25. The parallel light rays then reach the reflective surface 23, which is arranged in inclination at a preset angle of approximately 45° relative to a horizontal plane. Next, after total reflection by the reflective surface 23, the optical path of the light rays changes direction by 90°, as indicated by an arrow 100 in FIG. 2, where the direction of light propagation changes from upward to leftward. Then the light rays reach the optical filter 22. The optical filter 22 may be a light-filtering plate, on which a $\lambda 1$ band-pass membrane is coated. Therefore, the light rays propagating leftward pass through the optical filter 22 so that the first optical signal reaches the transceiver lenses 27 of the optical transceiver interface 211 and finally passes through the transceiver lenses 27 to converge into an optical fiber. The optical path from the light transmitting elements 30 to the transceiver lenses 27 forms the first optical path L1.

At the same time, the second optical signal at a wavelength $\lambda 2$ transmitted from the optical fiber is converted to parallel light rays after passing through the transceiver lenses 27. The parallel light rays then reach the optical filter 22, which is also coated with a $\lambda 2$ reflective film and is arranged in inclination at a preset angle of approximately 45° relative to the horizontal plane. Next, after total reflection by the optical filter 22, the optical path of the light rays changes direction by 90°, as indicated by an arrow 102 in FIG. 2, where the direction of light propagation changes from rightward to downward. Then the light rays reach the auxiliary lens 28 to be re-converged before they are converged by the receiving lenses 26 onto the light receiving elements 40. The optical path from the transceiver lenses 27 to the light receiving elements 40 forms the second optical path L2.

The optical module further includes the optical fiber 50 installed at the optical transceiver interface 211. An end portion of the optical fiber 50 has a cut surface 51 of approximately 8° relative to a vertical surface, which may be formed by laser cutting, to effectively reduce reflection on the optical path.

In accordance with the embodiments, light coming out of the optical fiber 50 passes through the transceiver lenses 27 and is converted to parallel light rays, which are reflected by the coated surface of the optical filter 22 to the auxiliary lens 28. Here, the optical path is long so the parallel light rays may diverge. The auxiliary lens 28 may re-converge the light rays, which are then converged by the receiving lenses 26 to the light receiving elements 40. Thus, the light spot of the optical signal may be better concentrated, thus obtaining a greater coupling efficiency and a larger tolerance range.

Continuing to refer to FIGS. 2 and 3, a first inclined-surface recess 213 and a second inclined-surface recess 214 are arranged at the upper portion of the device body 21. The two inclined-surface recesses 213 and 214 may be connected at the top (i.e., the two inclined-surface recesses are partially connected). Alternatively, the two inclined-surface recesses 213 and 214 may be separately arranged with a space between them. A mounting surface 212 and a recessed space 215 that extends below the mounting surface 212 are formed on the first inclined-surface recess 213. Light that enters the optical device 20 through the optical transceiver interface 211 passes through the recessed space 215 before reaching the optical filter 22. The optical filter 22 is secured to the mounting surface 212 and extends into the recessed space 215. The material of the optical filter 22 may be glass or PEI (polyetherimide), which is secured to the device body 21 by gluing. For example, the optical filter 22 may be mounted to the mounting surface 212. Here, an air gap is present between the first inclined surface 222 of the optical filter 22 and the device body 21. The second optical signal at wavelength λ2 transmitted from the optical fiber first passes through the air gap before reaching the first inclined surface 222. Then, the second optical signal is reflected from the first inclined surface 222 to the air gap before reaching the auxiliary lens 28. The light-filtering plate may be considered to be mounted in an area of the optical device 20 that is not an optical functional area. A relatively large difference between the refractive indices of air and the optical filter 22 makes beam splitting easier. The optical filter 22 may be coated with a beam-splitting film of any transmittance rate. Therefore, the ratio of outputted light can be easily selected with simple operations at a lower cost. Additionally, the recessed space 215 has a bottom wall 215a arranged parallel to the first surface 218 and a side wall 215b connected to the bottom wall, and the angle between the side wall 215b and the bottom wall 215a is an obtuse angle greater than 90° and less than 100°. The auxiliary lens 28 may be disposed on the bottom wall 215a to simplify the technique for producing the optical device 20. The auxiliary lens 28 may be a separate structure or formed as a one-piece structure together with the device body 21.

Furthermore, the second inclined-surface recess 214 has a second inclined surface, which is a side wall of the second inclined-surface recess 214. The second inclined surface constitutes the reflective surface 23. The first optical signal transmitted from the light transmitting elements 30 can be reflected by the reflective surface 23 to the transceiver lenses 27.

Additionally, as shown in FIGS. 5 through 8, in the example embodiment, the inside of the entire optical device 20 contains 8 optical channels. The number of optical channels may be selected to be 8, 4, 2, or 1. The 8 optical channels may be arranged in an array, or the 8 optical channels may be divided into 2 groups, which are arranged in arrays.

In other embodiments, the positions of the light transmitting elements, the transmitting lenses, and the optical filter may correspond to each other, while the positions of the light receiving elements and the reflective surface may correspond to each other. The auxiliary lens may be disposed on the second optical path near the light receiving elements or on the first optical path near the light transmitting elements. For example, the first inclined surface and the transmitting lenses may correspond in their locations, and the optical filter may reflect the second optical signal to the transceiver lenses; the reflective surface and the receiving lenses may correspond in their locations, the reflective surface reflecting the first optical signal to the receiving lenses; and the auxiliary lens may be disposed between the receiving lenses and the reflective surface.

In the aforementioned example embodiments, the auxiliary lens may be located on the first optical path near the transmitting lenses or on the second optical path near the receiving lenses. Alternatively, auxiliary lenses may be disposed on both the first and second optical paths.

In the aforementioned example embodiments, the addition of the auxiliary lens onto the optical path to shrink the light's divergence angle allows the light spot to be better concentrated, thus obtaining a greater coupling efficiency and a larger tolerance range. Additionally, the light transmitting elements and the light receiving elements may be arranged side-by-side in parallel while ensuring that the optical path is unobstructed. As a result, the size of the lens array structure may be reduced to fully meet requirements for small-sized packaging while also meeting performance requirements.

It should be understood that despite the descriptions of embodiments in the specification, each embodiment does not entail only one independent technical solution. The specification is written this way simply for the sake of clarity. Persons having ordinary skill in the art should treat the specification as a whole; the technical solutions in the embodiments may be combined in appropriate ways to form other embodiments that may be understood by persons having ordinary skill in the art.

The series of detailed descriptions above is only intended to provide specific descriptions of feasible embodiments of the present disclosure. They are not to be construed as limiting the scope of protection for the present disclosure; all equivalent embodiments or changes that are not detached from the techniques of the present disclosure in essence should fall under the scope of protection of the present claims.

What is claimed is:

1. An optical module comprising:
a substrate;
an optical device; and
a plurality of light transmitting elements and a plurality of light receiving elements disposed on the substrate, and between the optical device and the substrate,
wherein the optical device is disposed above the plurality of light transmitting elements and the plurality of light receiving elements, the optical device comprises a device body, and an optical transceiver interface and a lens array that are disposed on the device body, the optical device is configured so that an optical signal transmitted from the plurality of light transmitting elements passes through the optical transceiver interface before leaving the optical module, and an optical signal transmitted from outside of the optical module passes through the optical transceiver interface before reaching the plurality of light receiving elements, the lens array is configured to optically couple the plurality of light transmitting elements with the optical transceiver interface, and to optically couple the optical transceiver interface with the plurality of light receiving elements, the lens array comprises:

a plurality of light transmitting lenses arranged along a same direction as the plurality of light transmitting elements and located on a first surface of the device body facing the plurality of light transmitting elements, light transmitted from each of the plurality of light transmitting elements entering into a corresponding one of the plurality of light receiving light transmitting lenses;

a plurality of light receiving lenses arranged along the same direction as the plurality of light receiving elements and located on the first surface of the device body facing the plurality of light receiving elements, light entering into each of the plurality of light receiving elements coming from a corresponding one of the plurality of light receiving light receiving lenses;

a reflective surface arranged at a preset angle relative to the first surface, the reflective surface reflecting light from each of the plurality of light transmitting lenses to the optical transceiver interface or reflecting light from the optical transceiver interface to the plurality of light receiving lenses;

an optical filter arranged parallel to the reflective surface, the optical filter reflecting light from the optical transceiver interface to the plurality of light receiving lenses and letting pass light reflected by the reflective surface from each of the plurality of light transmitting lenses, or reflecting light from each of the plurality of light transmitting lenses to the optical transceiver interface and letting pass light from the optical transceiver interface;

a plurality of optical transceiver lenses arranged in the same direction as the plurality of light transmitting lenses and formed on a second surface of the device body, the plurality of optical transceiver lenses receiving reflected light from the reflective surface or the optical filter and guiding light that enters the optical transceiver interface to the optical filter or the reflective surface; and at least one auxiliary lens disposed on an optical coupling path between the plurality of light transmitting elements and the optical transceiver interface, or on an optical coupling path between the optical transceiver interface and the plurality of light receiving elements.

2. The optical module of claim 1, wherein the reflective surface and the transmitting lenses correspond in their locations, the reflective surface reflects a second optical signal to the transceiver lenses, and the auxiliary lens is disposed between the receiving lenses and the optical filter.

3. The optical module of claim 1, wherein a first inclined-surface recess is disposed on the device body, the first inclined-surface recess has a mounting surface and a recessed space that extends below the mounting surface, the optical filter is mounted on the mounting surface and extends into the recessed space, and light that enters the optical device through the optical transceiver interface passes through the recessed space before reaching the optical filter.

4. The optical module of claim 3, wherein the recessed space comprises a bottom wall parallel to the first surface and a side wall connected to the bottom wall, and the plurality of auxiliary lenses are disposed on the bottom wall.

5. The optical module of claim 4, wherein a second inclined-surface recess is also arranged on the device body, and the reflective surface is formed by a side wall of the second inclined-surface recess.

6. The optical module of claim 1, wherein the optical module further comprises a driver chip that drives the light transmitting elements and a TIA (transimpedance amplifier) chip that drives the light receiving elements, and the plurality of light transmitting elements, driver chip, plurality of light receiving elements, and TIA chip are all mounted on the substrate.

7. The optical module of claim 6, wherein the substrate is a PCB (printed circuit board) including a portion filled with high density through-hole copper, and the plurality of light transmitting elements, driver chip, plurality of light receiving elements, and TIA chip are all mounted on the portion filled with high density through-hole copper.

8. The optical module of claim 6, wherein a portion of the substrate is embedded with a copper plate, and the plurality of light transmitting elements, driver chip, plurality of light receiving elements, and TIA chip are all mounted on the copper plate.

9. The optical module of claim 6, wherein the device body comprises a body recess, a recess bottom of the body recess forms the first surface, and at least the plurality of light transmitting elements and the plurality of light receiving elements are positioned correspond to the body recess.

10. The optical module of claim 6, wherein a substrate recess is arranged on the substrate, and at least the plurality of light transmitting elements and the plurality of light receiving elements are located in the substrate recess.

* * * * *

UNITED STATES PATENT AND TRADEMARK OFFICE
CERTIFICATE OF CORRECTION

PATENT NO. : 11,418,262 B2
APPLICATION NO. : 16/810965
DATED : August 16, 2022
INVENTOR(S) : Ming Han et al.

Page 1 of 1

It is certified that error appears in the above-identified patent and that said Letters Patent is hereby corrected as shown below:

On the Title Page

Item (71), in the Applicant, Line 2, "Jiangsu (CN)" should read --Suzhou (CN)--.

Item (72), in the Inventors, Lines 1-2, "Ming Han, Jiangsu (CN); Yue Xiao, Jiangsu (CN)" should read --Ming Han, Suzhou (CN); Yue Xiao, Suzhou (CN)--.

In the Claims

In Claim 1, Column 9, Lines 24-25, "the plurality of light receiving light transmitting lenses;" should read --the plurality of light transmitting lenses;--.

In Claim 1, Column 9, Lines 31-32, "the plurality of light receiving light receiving lenses;" should read --the plurality of light receiving lenses;--.

Signed and Sealed this
Eleventh Day of October, 2022

Katherine Kelly Vidal
*Director of the United States Patent and Trademark Office*